United States Patent [19]
Custer et al.

[11] Patent Number: 5,948,257
[45] Date of Patent: Sep. 7, 1999

[54] CANDLE FILTER AND METHOD FOR MAKING

[75] Inventors: Milton F. Custer, Byron; Kevin D. McVicker, Livermore, both of Calif.

[73] Assignee: Hexcel Corporation, Pleasanton, Calif.

[21] Appl. No.: 08/642,062

[22] Filed: May 3, 1996

[51] Int. Cl.⁶ ............................................. B01D 29/00
[52] U.S. Cl. ............................. 210/500.26; 210/510.1; 210/506; 210/508; 210/323.1; 210/323.2; 264/445; 55/523; 55/524; 55/527
[58] Field of Search ................. 210/510.1, 508, 210/506, 323.1, 323.2, 505, 500.26, 497.01, 490, 500.25; 264/445; 156/89; 55/523, 524, 527

[56] References Cited

U.S. PATENT DOCUMENTS

| | | | |
|---|---|---|---|
| 4,500,328 | 2/1985 | Brassell et al. | 55/97 |
| 4,587,016 | 5/1986 | Sumiyoshi | 210/323.2 |
| 4,629,483 | 12/1986 | Stanton | 55/487 |
| 4,632,683 | 12/1986 | Fukutani et al. | 55/523 |
| 4,677,009 | 6/1987 | Virkar | 428/36 |
| 4,680,221 | 7/1987 | Murayama et al. | 428/246 |
| 4,687,579 | 8/1987 | Bergman | 210/347 |
| 4,711,719 | 12/1987 | Leenaars et al. | 210/500.26 |
| 4,713,285 | 12/1987 | Klein | 428/283 |
| 4,894,070 | 1/1990 | Keidel et al. | 55/96 |
| 4,904,287 | 2/1990 | Lippert et al. | 55/302 |
| 4,917,941 | 4/1990 | Hillig et al. | 428/283 |
| 4,960,448 | 10/1990 | Zievers | 55/523 |
| 4,973,459 | 11/1990 | Lippert et al. | 423/244 |
| 4,976,760 | 12/1990 | Helferich et al. | 55/487 |
| 5,071,457 | 12/1991 | Schmidt, Jr. et al. | 55/523 |
| 5,073,178 | 12/1991 | Mimori et al. | 55/523 |
| 5,075,160 | 12/1991 | Stinton et al. | 428/282 |
| 5,087,277 | 2/1992 | Gonzales et al. | 55/523 |
| 5,098,454 | 3/1992 | Carpentier et al. | 55/523 |
| 5,196,120 | 3/1993 | White | 210/504 |
| 5,223,138 | 6/1993 | Zievers et al. | 210/497.1 |
| 5,238,478 | 8/1993 | Zievers et al. | 55/523 |
| 5,252,525 | 10/1993 | Gonzales et al. | 501/124 |
| 5,334,426 | 8/1994 | Smith | 428/34.4 |
| 5,433,771 | 7/1995 | Bachovchin et al. | 95/280 |
| 5,436,042 | 7/1995 | Lau et al. | 428/34.6 |
| 5,443,806 | 8/1995 | Isaksson et al. | 423/237 |
| 5,605,553 | 2/1997 | Conolly et al. | 55/487 |
| 5,605,628 | 2/1997 | Davidson et al. | 428/307.7 |
| 5,705,444 | 1/1998 | Tompkins et al. | 442/76 |

*Primary Examiner*—Ana Fortuna
*Attorney, Agent, or Firm*—Townsend and Townsend and Crew LLP

[57] ABSTRACT

The invention provides a high temperature, damage tolerant candle filter (4) made of a porous ceramic material which is designed so that, if it fails, it does not fail catastrophically. The ceramic candle filter includes a hollow tube (14) having an open end, a closed end and a porous outer wall therebetween. The porous wall is made of a fiber ceramic reinforcement material impregnated with ceramic particles and a fugitive material that is substantially removed from the fiber ceramic reinforcement material or partially converting into a permeable material to provide porosity. The reinforcement material is generally strong enough to absorb the initial explosion force created when the ceramic particle carrier fails during, for example, reverse pressurization of the candle filter, thereby preventing the ceramic pieces from becoming projectiles.

20 Claims, 4 Drawing Sheets

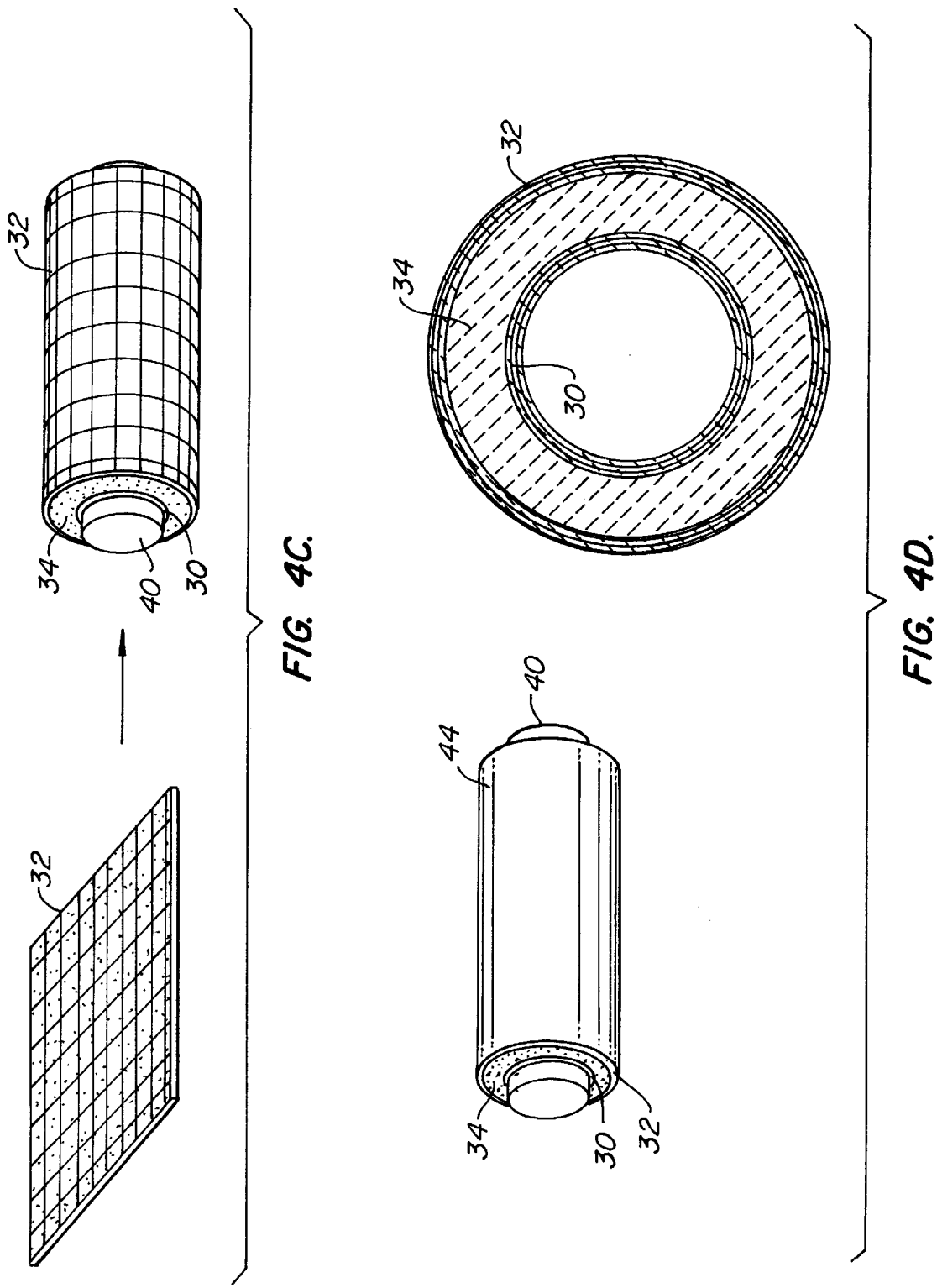

CANDLE FILTER AND METHOD FOR MAKING

BACKGROUND OF THE INVENTION

The present invention relates generally to ceramic tubes and more particularly to a ceramic candle filter and a method of manufacturing the ceramic candle filter.

The hot combustion intake and exhaust gases in industrial and utility cogeneration systems and fossil-based power generation plants entrain a large amount of particulate matter. These hot intake or exhaust gases are typically cleaned prior to venting into the atmosphere, or prior to introduction into a gas turbine for power generation. Dirty gas is directed into filter bags suspended within a chamber, through the filter bags and out the chamber exhaust. For high temperature applications, the filter bags are typically replaced by porous ceramic filters called candles or candle filters. These candle filters are hollow ceramic tubes mounted to a manifold in a chamber downstream form the combustion chamber. The dirty gas within the chamber interior passes through the walls of the candle filter leaving the ash and other particulate matter on the outer collection surface of the candle filter. The clean hot gas then exits through the open top of the candle filters into a turbine or other outlet.

To periodically clean candle filters, reverse pressurization is applied. That is, air at about 200–400 psi is passed back through the candle filter to dislodge the dirt and other particles on the outer collection surfaces of the candle filters for subsequent removal. The dislodged particles fall to a bottom grating from which they are removed from the chamber.

One of the problems with conventional porous ceramic candles is that the ceramic material is relatively brittle. Thus, subjecting the ceramic candles to high pressures during reverse pressurization, can, if any of the candles are at all defective or damaged, cause the candle to break catastrophically during this reverse pressurization. Due to the amount of pressure used, the failed candle literally explodes, sending pieces of the failed candle in all directions. When this occurs, the pieces become projectiles, striking other candles within the chamber and causing a chain reaction of failed candles. This failure occurs very quickly, generally before the operation can reduce pressurization to halt the cascading effects.

One known method of avoiding the breakage problems of ceramic tubes is to use metal tubes instead of ceramic tubes. Two primary disadvantages of metal tubes, however, are their temperature and corrosion limitations. In addition, metal tubes are usually quite heavy and often suffer from fatigue failure. Metals which are more resistant to high temperatures and corrosion are very often too expensive to use for filters.

SUMMARY OF THE INVENTION

The present invention is directed to a high temperature, damage tolerant candle filter made of a porous ceramic material which is designed so that, if it fails, it does not fail catastrophically. That is, if the candle filter breaks, it is designed so that it will simply rupture, rather than blowing apart into hundreds or thousands of pieces.

The ceramic candle filter of the present invention includes a hollow tube having an open end, a closed end and a porous outer wall therebetween. The porous wall is made of a fiber ceramic reinforcement material impregnated with ceramic particles and a fugitive or a convertible ceramic precursor filler material that is substantially removed or converted from the fiber ceramic reinforcement material during sintering to provide porosity. The reinforcement material is generally strong enough to absorb the initial explosive force created when the ceramic particle carrier fails during, for example, reverse pressurization of the candle filter, thereby preventing the ceramic pieces from becoming projectiles.

The ceramic candle filter is preferably formed by wrapping the fiber ceramic reinforcement material around a mandrel and impregnating the reinforcement material with a slurry of ceramic particles with a filler in a particle carrier medium and a thermoset binder. The reinforcement material is made of long, continuous or non-continuous, ceramic fibers which provide high hoop strength and damage tolerance for the finished candle filter. The wrapped mandrel is then heated at a relatively low temperature to rigidify the thermoset binder. The now rigid tubular composition is then removed from the mandrel and sintered at a substantially higher temperature to create the body of the candle filter. The ends of the candle filter are then finished to permit one end to be capped and the other end mounted to the manifold before rigidifying the thermoset binder. The resulting candle filter provides the user with the advantages of ceramic tubes for high temperature gas filtration, including low cost, good tribological properties, porosity, high strength, high service temperature and good corrosion properties, with the impact strength, toughness and non-brittle characteristics provided by the reinforcement material.

The porosity of the candle filter is preferably obtained by using a fugitive material or partially convertible ceramic precursor in the slurry. One fugitive material is the thermoset binder which becomes rigid when heated to a relatively low temperature, such as 350° F., but then burns out when sintered at a relatively high temperature, typically about 1,200° F. to 2,000° F. Other fugitive materials which burn out or partially burn out during sintering can be added to the slurry, such as organic materials, sawdust, acrylic polymers or the like. Porosity can also be obtained by an inorganic precursor, such as silicone, polycarbosilanes, dimethyl, siloxane, vinyl polysilane and the like. For example, during sintering, silicone transforms into silica, which remains as part of the candle filter, and carbon dioxide, carbon monoxide and water vapor, which escape from the candle filter, leaving porosity in the remaining portions of the candle filter.

Other features and advantages of the invention will appear from the following description in which the preferred embodiments have been set forth in detail in conjunction with the accompanying drawing.

BRIEF DESCRIPTION OF THE DRAWINGS

FIGS. 4A–4D are schematic views illustrating the method of manufacturing the candle filter of FIG. 1 according to the principles of the present invention.

DESCRIPTION OF THE PREFERRED EMBODIMENT

Figure 1:
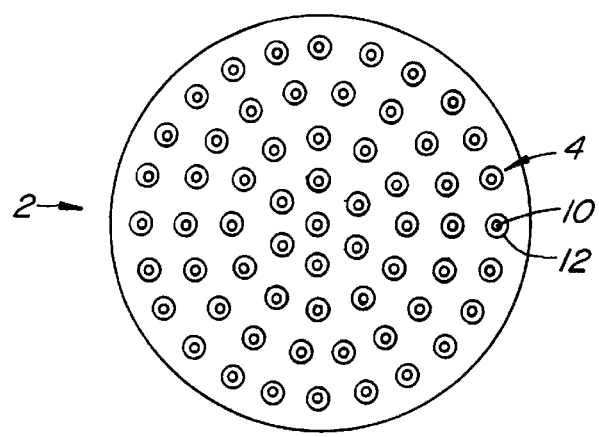
FIG. 1 is a top view of a representative chamber incorporating a plurality of candle filters according to the present invention.
Figure 2:
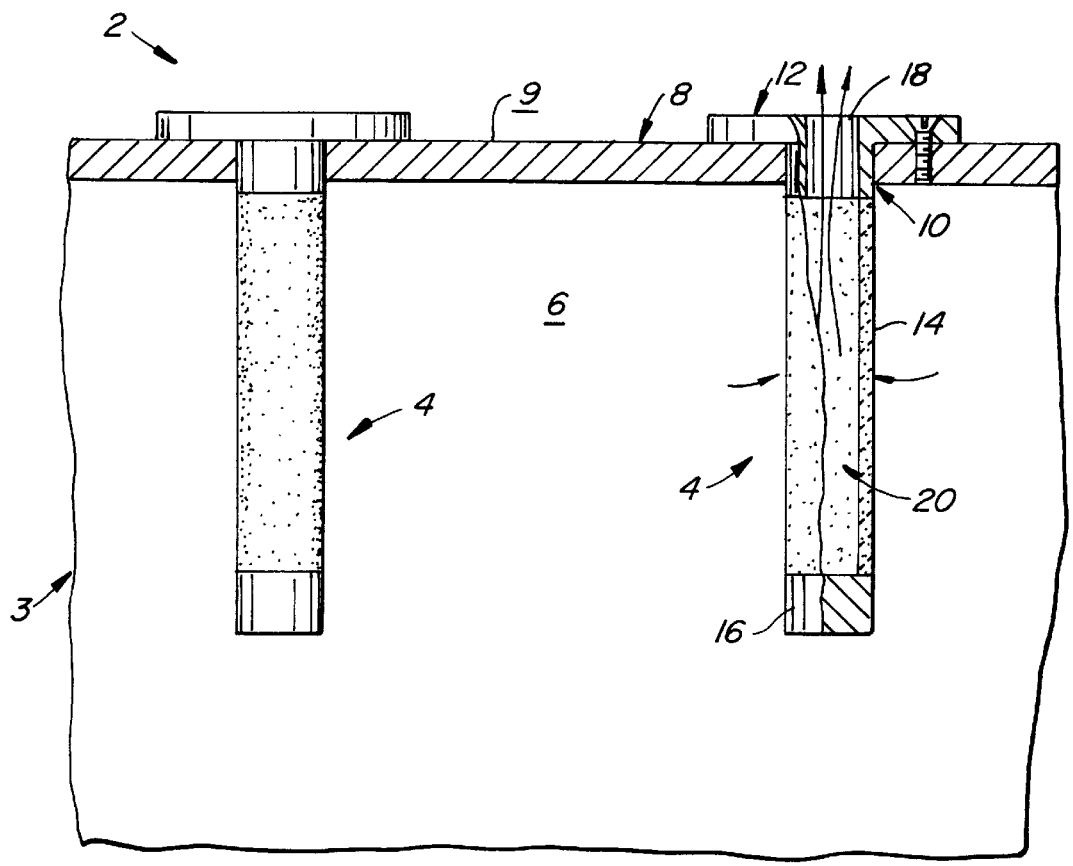
FIG. 2 is a side cross-sectional view of two of the candle filters of FIG. 1.

Referring to the drawings in detail, wherein like numerals indicate like elements, a representative chamber 2 incorporating a plurality of candle filters 4 is illustrated according to the present invention. As shown in FIGS. 1 and 2, chamber 2 generally includes an enclosure (not shown) defining an interior 6 and an upper manifold 8 with a plurality of gas exhaust openings 10 therein. Candle filters 4 are mounted to an exterior surface 9 of manifold 8 over the gas exhaust openings 10 for filtering entrained particulate matter from gases passing from the interior 6 of enclosure 3 through openings 10. Of course, it should be understood that although the candle filters 4 of the present invention are shown and described as gas filters in a chamber, they are not intended to be limited in that manner. That is, candle filters 4 can be used with other gas filter systems, such as pressurized fluidized bed combustion systems, and for liquid filter systems, such as for the filtration of products in the pharmaceutical industry, filtration of fuel and lubricant oils, filtration of electroplating liquid, the recovery of solvents and the like.

As shown in FIG. 2, each candle filter 4 generally includes an annular flange 12 for mounting filter 4 to manifold 8, a closed end 16 for sealing the filter 4 and a hollow, porous outer tube 14 therebetween. Flange 12 has an opening 18 in communication with an inner chamber 20 within outer porous tube 14 to provide a path for gases to escape the chamber 2. Flange 12 and end 16 are connected to either end of outer tube 14.

Figure 3:
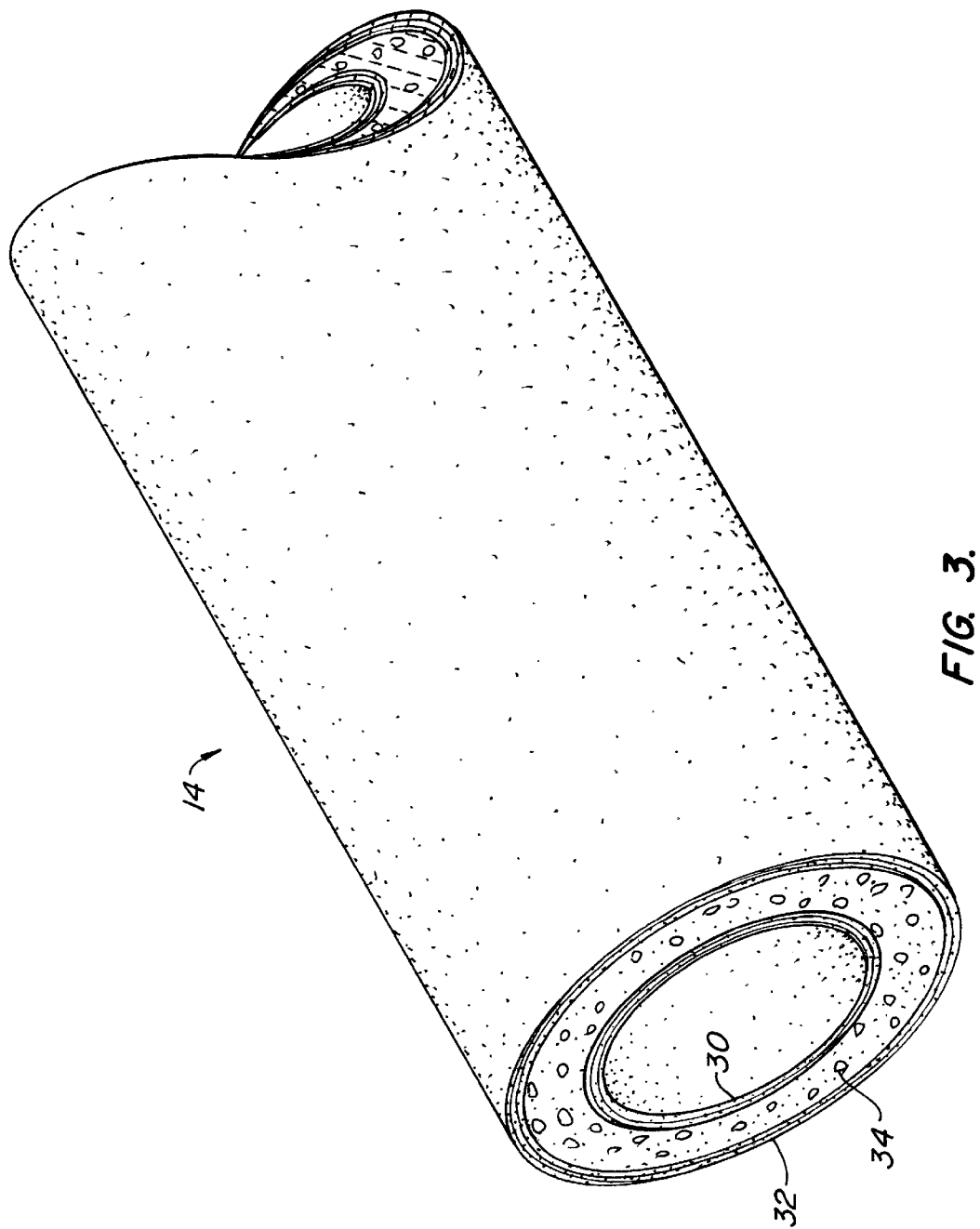
FIG. 3 is a partial isometric view of the ceramic portion of the candle filter of FIG. 1.

Outer tube 14 is made with a flexible reinforcement layer impregnated with a ceramic slurry which is then heated to form the cured CFCC item. As shown in FIG. 3, outer tube 14 preferably comprise inner and outer ceramic reinforcement layers 30, 32 surrounding a ceramic saturated reticulated foam 34. The reinforcement layers 30, 32 can be made of continuous or non-continuous fibers, woven fibers, a fibrous non-woven mat, braided fibers, non-woven filaments, a pattern material or a combination thereof. The reinforcement material used in layers 30, 32 includes ceramic fibers or fabrics, such as silicon carbide, silicon nitride, alumina, mullite, silica, quartz, single crystal ceramics and the like. The layers 30, 32 can be made with the majority of the continuous fibers in the direction of width (i.e., the warp direction of the fabric) to provide the desirable hoop strength. The minimal fibers extending in the direction of length (i.e., the fill direction of the fabric) are generally necessary to create the fabric and hold the warp yarns in place. The proportion of warp to fill fibers will usually range from about 1:1 to 20:1 and preferably between about 1:1 and 4:1.

The ceramic foam 34 is an organic composition saturated with a slurry of ceramic particles producing an impregnated sponge. Preferably, the organic composition comprises a particle carrier medium and a thermoset binder. The ceramic slurry is typically made of fine grains of alumina, mullite, lithium aluminum silicate, calcium aluminum silicate, silica, silicon carbide, silicon nitride, glass or a combination, in a solvent, such as a ketone, with an acrylic binder, for example, methyl methacrylate and a catalyst. The ceramic slurry may also contain additional fugitive material to provide additional porosity to the walls of the candle filter. One fugitive material is the thermoset binder which becomes rigid when heated to a relatively low temperature, such as 350° F., but then burns out when sintered at a relatively high temperature, typically 1,200° F. Alternatively or additionally, other fugitive materials can be added to the slurry which burn out during sintering at high temperatures, such as sawdust, resins, organic compositions or the like.

Porosity can also be obtained by a fugitive material that is converted or partially converted into a more porous material during sintering. One example of such a material is an inorganic precursor, such as silicone, polysiloxane, Black glass® or the like. During sintering, silicone, for example, transforms into silica, which remains as part of the candle filter, and carbon dioxide, carbon monoxide and water vapor, which escape. The percentage conversion of the precursor silicone can be varied according to the specific composition of a precursor. For example, one can vary the conversion of the precursor silicone to silica from, for example, 20% to 80%, so that the resulting porosity varies inversely with the percent of conversion from silicone to silica. Thus, if 80% of the silicone gets converted to silica, the other 20% of the silicone simply burns off leaving porosity.

Other fugitive materials suitable for the present invention are inorganic precursors that have been converted into a glassy material. The glassy material is then reacted with small particles, such as alumina, to form a crystallized phase that is generally resistant to sulfate and sodium oxide attack. For example, one suitable inorganic precursor is silicone, which is reacted with nanometer sized alumina particles and sintered at temperatures in the range of 1300° C. to 1400° C. to form mullite.

Figure 4A:
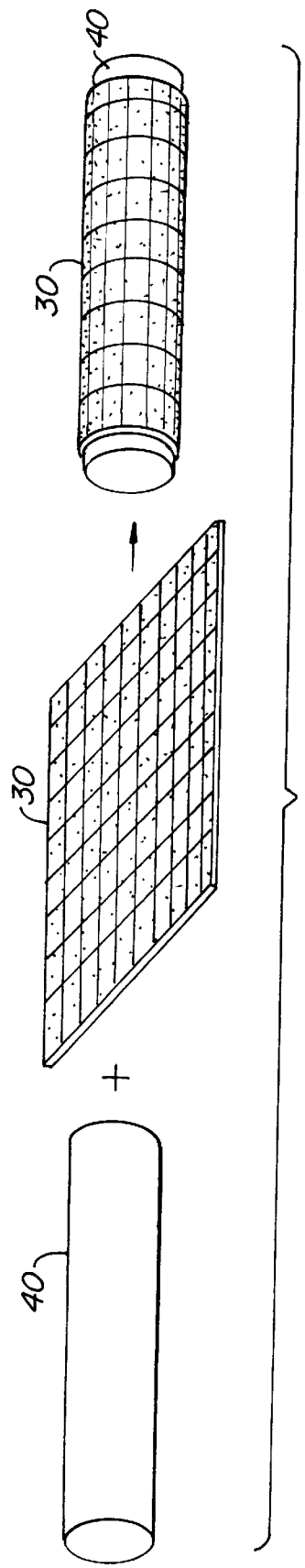
Figure 4B:
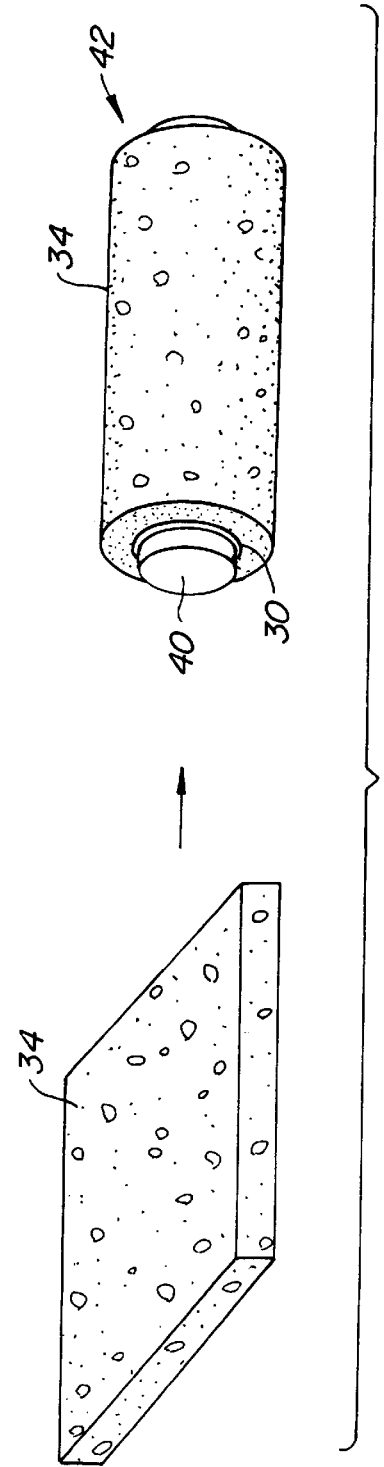

The preferred method of manufacturing the ceramic candle filter 4 of the present invention will now be described with reference to FIGS. 4A–4D. A mandrel 40 having the desired inside diameter of outer tube 14 is wrapped circumferentially with one or more layers of continuous or non-continuous fiber ceramic composite prepreg to form inner layer 30 (FIG. 4A). As shown in FIG. 4B, a reticulated sponge having an organic composition is saturated with a ceramic slurry to produce a layer of impregnated ceramic foam 34. The ceramic foam 34 is then wrapped around the composite prepeg 30 at least once to produce a prepreg/foam wrapped composite 42. The ceramic slurry will include a fugitive material, as discussed above. Composite 42 is then wrapped with one or more layers of a continuous or non-continuous fiber ceramic composite prepreg to form outer layer 32 (FIG. 4C).

As shown in FIG. 4D, the continuous fibers and ceramic slurry are then overwrapped with a spiral winding of nylon or cellophane film 44. The wrapped tube is then placed in an oven at about 175° C. to cause the film to shrink and the acrylic thermoset binder to become rigid. The shrinkage of the film effectively ensures consolidation of the reinforcement layer during subsequent sintering. Consolidation can also be accomplished by autoclaving. After removal from the curing oven, the nylon or cellophane film may be removed (to prevent excessive smoking during sintering) and the reinforcement composite is placed in a sintering furnace between about 1,000° F. to 2,000° F. Sintering drives off any remaining solvent and burns out the fugitive material leaving a porous ceramic labyrinth 34 as a porous filter between the inner and outer reinforcement layers 30, 32.

Further modifications and variations can be made to the disclosed embodiments without departing from the subject of the invention as defined in the following claims. For example, outer tube 14 can be made by other methods, such as by wrapping a continuous fiber reinforced ceramic prepreg tape (not shown) around the mandrel. The prepreg tape is similar to the impregnated fabric, but is about ½-inch wide and is wrapped in a spiral fashion about mandrel. The use of prepreg tape allows a controlled placement of the fibers relative to the end use and the structural needs. That is, the tape can be cut or otherwise oriented such that the bulk of the fiber reinforcement is placed in, for example, the hoop direction of the tube. The ceramic foam precursor and the outer reinforcement can also be applied as a tape in a continuous fashion.

What is claimed is:

1. A candle filter comprising
   a hollow tube having an open end, a closed end and a porous wall therebetween,
   the porous wall comprising a layer of ceramic foam containing the majority of the porosity of the wall, said wall formed from a flexible reinforcement layer impregnated with ceramic particles and a fugitive material that is substantially removed or converted during sintering to provide porosity;
   wherein the fugitive material comprises a convertible material that is at least partially converted into a permeable material during sintering at temperatures between about 500° F. to 2000° F.;
   wherein the convertible material is an inorganic precursor that is converted into a glassy material and reacted with small particles to form a crystallized phase that is substantially resistant to sulfate and sodium oxide.

2. The candle filter of claim 1 wherein the inorganic precursor is silicone.

3. The candle filter of claim 1 wherein the small particles are alumina particles and the crystallized phase is mullite.

4. A method of manufacturing a candle filter comprising:
   forming a hollow tube of fiber ceramic composite material;
   impregnating the fiber ceramic composite material by saturating said material with ceramic particles and a fugitive material, wherein the fugitive material is an inorganic precursor;
   applying heat to the fiber ceramic composite material to rigidify the ceramic particles and to remove or convert the fugitive material, leaving porosity; and
   substantially removing a portion of the precursor by sintering the precursor, wherein the sintering comprises transforming a silicone precursor into silica, carbon dioxide, carbon monoxide and water vapor and allowing the carbon dioxide, carbon monoxide and water vapor to escape, leaving open porosity.

5. A method of manufacturing a candle filter comprising:
   forming a hollow tube of fiber ceramic composite material;
   impregnating the fiber ceramic composite material by saturating said material with ceramic particles and a fugitive material, wherein the fugitive material is an inorganic precursor;
   applying heat to the fiber ceramic composite material to rigidify the ceramic particles and to remove or convert the fugitive material, leaving porosity;
   converting the inorganic precursor into a glassy material; and
   reacting the glassy material with small particles to form a crystallized phase that is substantially resistant to sulfate and sodium oxide.

6. The method of claim 5 wherein the small particles are alumina and the crystallized phase is mullite.

7. A candle filter comprising:
   a hollow tube having an open end, a closed end and a porous wall therebetween,
   the porous wall comprising a layer of ceramic foam containing the majority of the porosity of the wall, said wall formed from a flexible reinforcement layer impregnated with ceramic particles and a fugitive material that is substantially removed or converted during sintering to provide porosity;
   wherein the flexible reinforcement layer comprises a plurality of relatively long, continuous ceramic woven fibers which include axial fibers oriented parallel to the longitudinal axis and hoop fibers oriented in a circumferential direction relative to the longitudinal axis.

8. The candle filter of claim 7 wherein the ratio of hoop fibers to axial fibers is between about 1 to 1 and 6 to 1.

9. A candle filter comprising:
   a hollow tube having an open end, a closed end and a porous wall therebetween,
   the porous wall comprising a layer of ceramic foam containing the majority of the porosity of the wall, said wall formed from a flexible reinforcement layer impregnated with ceramic particles and a fugitive material that is substantially removed or converted during sintering to provide porosity;
   wherein the fugitive material comprises a convertible material that is at least partially converted into a permeable material during sintering at temperatures between about 500° F. to 2000° F.;
   wherein the convertible material is an inorganic precursor that is converted into a glassy material and reacted with small particles to form a crystallized phase that is substantially resistant to sulfate and sodium oxide.

10. The candle filter of claim 9 wherein the inorganic precursor is silicone.

11. The candle filter of claim 9 wherein the small particles are alumina particles and the crystallized phase is mullite.

12. A method of manufacturing a candle filter comprising:
    forming a hollow tube of fiber ceramic composite material by applying one or more layers of continuous ceramic fibers around a mandrel, the layers applied by rolling a length of the fibers about the mandrel;
    impregnating the fiber ceramic composite material by saturating said material with ceramic particles and a fugitive material; and
    applying heat to the fiber ceramic composite material to rigidify the ceramic particles and to remove or convert the fugitive material, leaving porosity.

13. A method of manufacturing a candle filter comprising:
    forming a hollow tube of fiber ceramic composite material by wrapping a first ceramic prepreg around a mandrel;
    wrapping a ceramic saturated reticulated sponge member around the ceramic prepreg;
    wrapping a second ceramic prepreg around the ceramic saturated reticulated foam member;
    impregnating the fiber ceramic composite material by saturating said material with ceramic particles and a fugitive material; and
    applying heat to the fiber ceramic composite material to rigidify the ceramic particles and to remove or convert the fugitive material, leaving porosity.

14. A method of manufacturing a candle filter comprising:
    forming a hollow tube of fiber ceramic composite material;
    impregnating the fiber ceramic composite material by saturating said material with a slurry of ceramic particles in a particle carrier medium and a thermoset binder; and
    applying heat to the fiber ceramic composite material to rigidify the ceramic particles and to remove or convert the fugitive material, leaving porosity.

15. The method of claim 14 wherein the applying heat step comprises rigidifying the thermoset binder.

16. The method of claim 14 wherein the applying heat step further comprises sintering the thermoset binder to substantially remove the thermoset binder.

17. A method of manufacturing a candle filter comprising:
forming a hollow tube of fiber ceramic composite material;
impregnating the fiber ceramic composite material by saturating said material with ceramic particles and an inorganic precursor;
applying heat to the fiber ceramic composite material to rigidify the ceramic particles and to remove or convert the fugitive material, leaving porosity; and
substantially removing a portion of the precursor by sintering the precursor to transform silicone into silica, carbon dioxide, carbon monoxide and water vapor and allowing the carbon dioxide, carbon monoxide and water vapor to escape, leaving open porosity.

18. A method of manufacturing a candle filter comprising:
forming a hollow tube of fiber ceramic composite material;
impregnating the fiber ceramic composite material by saturating said material with ceramic particles and a inorganic precursor;
applying heat to the fiber ceramic composite material to rigidify the ceramic particles and to remove or convert the fugitive material, leaving porosity;
converting the inorganic precursor into a glassy material; and
reacting the glassy material with small particles to form a crystallized phase that is substantially resistant to sulfate and sodium oxide.

19. The method of claim 18 wherein the small particles are alumina and the crystallized phase is mullite.

20. A method of manufacturing a candle filter comprising:
forming a hollow tube of fiber ceramic composite material by applying one or more layers of continuous fibers around a mandrel, the layers of fibers being selected from the group consisting essentially of woven fabric, non-woven fabric, mats, braid and paper;
impregnating the fiber ceramic composite material by saturating said material with ceramic particles and a fugitive material; and
applying heat to the fiber ceramic composite material to rigidify the ceramic particles and to remove or convert the fugitive material, leaving porosity.

* * * * *